US005263346A

United States Patent [19]

Sato et al.

[11] Patent Number: 5,263,346

[45] Date of Patent: Nov. 23, 1993

[54] LOCKING DEVICE FOR LID

[75] Inventors: Seiichi Sato; Seiji Sawatani, both of Yokohama, Japan

[73] Assignee: Kato Hatsujo Kaisha, Ltd., Yokohama, Japan

[21] Appl. No.: 952,273

[22] Filed: Sep. 28, 1992

[30] Foreign Application Priority Data

Oct. 15, 1991 [JP] Japan ............................ 3-091880[U]
Oct. 17, 1991 [JP] Japan ............................ 3-092671[U]

[51] Int. Cl.[5] .............................................. B60R 25/02

[52] U.S. Cl. ........................................ 70/210; 70/472; 70/218; 296/37.12; 292/DIG. 38

[58] Field of Search ................. 70/209, 210, 218, 256, 70/258, 472, 149, 159-162, 84; 292/53, 127, 216, 314.18, DIG. 37, DIG. 38; 49/394; 296/37.12, 901

[56] References Cited

U.S. PATENT DOCUMENTS 2,570,556 10/1951 Jacobi ..................................... 70/84
4,312,202 1/1982 Pastva, Jr. et al. .................... 70/472
4,534,193 8/1985 Takemura et al. .................... 70/218
4,580,822 4/1986 Fukumoto .............. 292/DIG. 38 X

FOREIGN PATENT DOCUMENTS 2375413 7/1978 France .
2531919 2/1984 France .
60-162663 10/1985 Japan .
61-130576 6/1986 Japan .
63-78670 5/1988 Japan .
1-151571 10/1989 Japan .
2126275 3/1984 United Kingdom .

*Primary Examiner*—Peter M. Cuomo
*Assistant Examiner*—Suzanne L. Dino
*Attorney, Agent, or Firm*—Wenderoth, Lind & Ponack

[57] ABSTRACT

A locking device for a lid on a box includes a frame adapted to be fixed on the side of the lid and provided with a cylinder lock having an eccentric shaft and a cylindrical retaining part for retaining the cylinder lock therein. An opening-shutting knob is pivotally supported on the frame and has a depressing claw part, and a locking member is provided on the side of the frame for locking a striker disposed on the side of the box. An operating lever has one end portion thereof connected to the eccentric shaft of the cylinder lock and the other end portion thereof serving to release a locked state of the locking member by interfering with the depressed claw part of the opening-shutting knob during unlocking of the locking device. The operating lever is formed of a synthetic resin material and has an elastic engaging piece integrally formed to the one end portion. The elastic engaging piece has a projecting part formed thereon. The frame has formed on the side of the cylindrical retaining part a stopper wall provided with a changeover slide surface, and the elastic engaging piece is secured on an inner side of the stopper wall. The projecting part of the elastic engaging piece can be moved along the changeover slide surface from one side of the stopper wall to the other.

8 Claims, 6 Drawing Sheets

LOCKING DEVICE FOR LID

BACKGROUND OF THE INVENTION

1. Field of the Invention

This invention relates to a key operation type locking device used in a lid for opening and shutting a box such as, for example, an automobile glove compartment.

2. Description of the Prior Art

The locking devices of this class heretofore known to the art include those which are disclosed in Japanese Utility Model Public Disclosure No. 60-162663, No. 63-78670 and No. 1-151571 and Japanese Patent Public Disclosure No. 61-130576, for example.

Though these conventional locking devices are more or less different in construction from one another, they basically comprise a frame provided with a cylinder lock to be fixed in the lid of a glove compartment, an opening-shutting knob pivotally supported on the front surface side of the frame, a storing (or retaining) part formed on the rear surface side of the frame and adapted to store therein a striker disposed on the compartment side, a locking member disposed vertically movably or rotatably and adapted to open or shut the opening of the storing part, an operating lever adapted to urge the locking member to move and provided on one terminal part thereof with a connecting hole, and an eccentric shaft disposed on the rear terminal of the cylinder lock and inserted idly inside the connecting hole, whereby the interlock of the rotation of the cylinder lock with the motion of the operating lever enables the other terminal part of the operating lever to be moved between a position at which the operating lever interferes with a depressing claw part disposed on the rear side of the opening-shutting knob and a position at which the interference is not produced.

When the key for initiating actual use of the locking device is operated so as to rotate the cylinder lock in the unlocking direction, the other terminal part of the operating lever is moved to the position in which it interferes with the depressing claw part of the opening-shutting knob, the opening-shutting knob is lifted against the resilient pressure which tends to return the opening-shutting knob to its home position, and the depressing claw part of the knob is caused to depress the other terminal part of the operating lever downwardly. This depression of the other terminal part side of the operating lever causes the locking member to move in a direction to open the storing part, effects automatic release of the locking state of the striker inside the storing part, and consequently allows release of the lid from the glove compartment.

When the cylinder lock is rotated in the locking direction, the other terminal part of the operating lever moves to the position in which it does not interfere with the depressing claw part of the opening-shutting knob, and the depressing claw part of the knob simply swings idly even if the opening-shutting knob in that state of the locking device is pulled up time and again. Thus, the lid is allowed to remain infallibly in the closed state.

In the conventional locking device utilizing this operating principle, however, since the operating lever which fulfills the role of keeping the locking device in the locked or unlocked state is formed of metallic material as a one-piece component and has one terminal part thereof simply inserted idly in the eccentric shaft of the cylinder lock through the connecting hole, it is necessary to provide a mechanism, such as a push-on fixing member (e.g. a washer) for preventing the one terminal part side of the operating lever from falling off the cylinder lock side.

The conventional locking device, therefore, not only makes assembly of the metallic operating lever troublesome but also inevitably results in an increase in the number of component parts and further requires the metallic operating lever to be subjected to a rustproofing surface treatment. This point constitutes one factor in the increased cost of production and possibly causes weight to be added to the device.

Further, for the purpose of preventing the opening-shutting knob from producing unwanted backlash and resiliently urging the opening-shutting knob to the home position, the conventional locking device adopts a constriction in which a double-torsion spring is mounted on the supporting shaft which serves to support the opening-shutting knob pivotally on the frame so that the resilient pressure of the double-torsion spring will urge the opening-shutting knob to the home position. The use of the double-torsion spring of this nature is advantageous in that this spring is capable of infallibly during the opening-shutting knob to the home position. In contrast, the work involved in attaching this opening-shutting knob to the frame is inefficient because the double-torsion spring must be attached to the supporting shaft and, at the same time, the opening-shutting knob must be attached to the frame, while the supporting shaft must e inserted through the bearing on the opening-shutting knob side and the bearing on the frame side.

The main object of this invention is to provide an improved locking device which is capable of effectively solving the problems of the conventional locking device described above.

SUMMARY OF THE INVENTION

To accomplish the above object, according to the present invention there is provided a locking device for a lid on a box, comprising a frame adapted to be fixed on the lid, a cylinder lock provided on the frame and having an eccentric shaft, and a cylindrical retaining part provided on the frame for retaining the cylinder lock therein. An opening-shutting knob has a depressing claw part and is pivotally supported on the frame. A locking member is provided for locking to the frame a striker disposed on the side of the box. An operating lever has one terminal part thereof connected to the eccentric shaft of the cylinder lock and the other terminal part thereof serving to release a locked state of the locking member by interfering with the depressed claw part of the opening-shutting knob during unlocking of the locking device. The operating lever is formed of a synthetic resin material and has an elastic engaging piece integrally formed on the side of the one terminal part. The elastic engaging piece has a projecting part formed thereon, and a stopper wall provided with a changeover slide surface is formed on the cylindrical retaining part side of the frame. The elastic engaging piece is set securely in place on an inner side of the stopper wall, and the projecting part of the elastic engaging piece is allowed to move over the changeover slide surface of the stopper wall.

Other objects and features of this invention will become apparent from the detailed description of the invention to be given herein below with reference to the accompanying drawings.

DETAILED DESCRIPTION OF THE PREFERRED EMBODIMENTS

Figure 1:
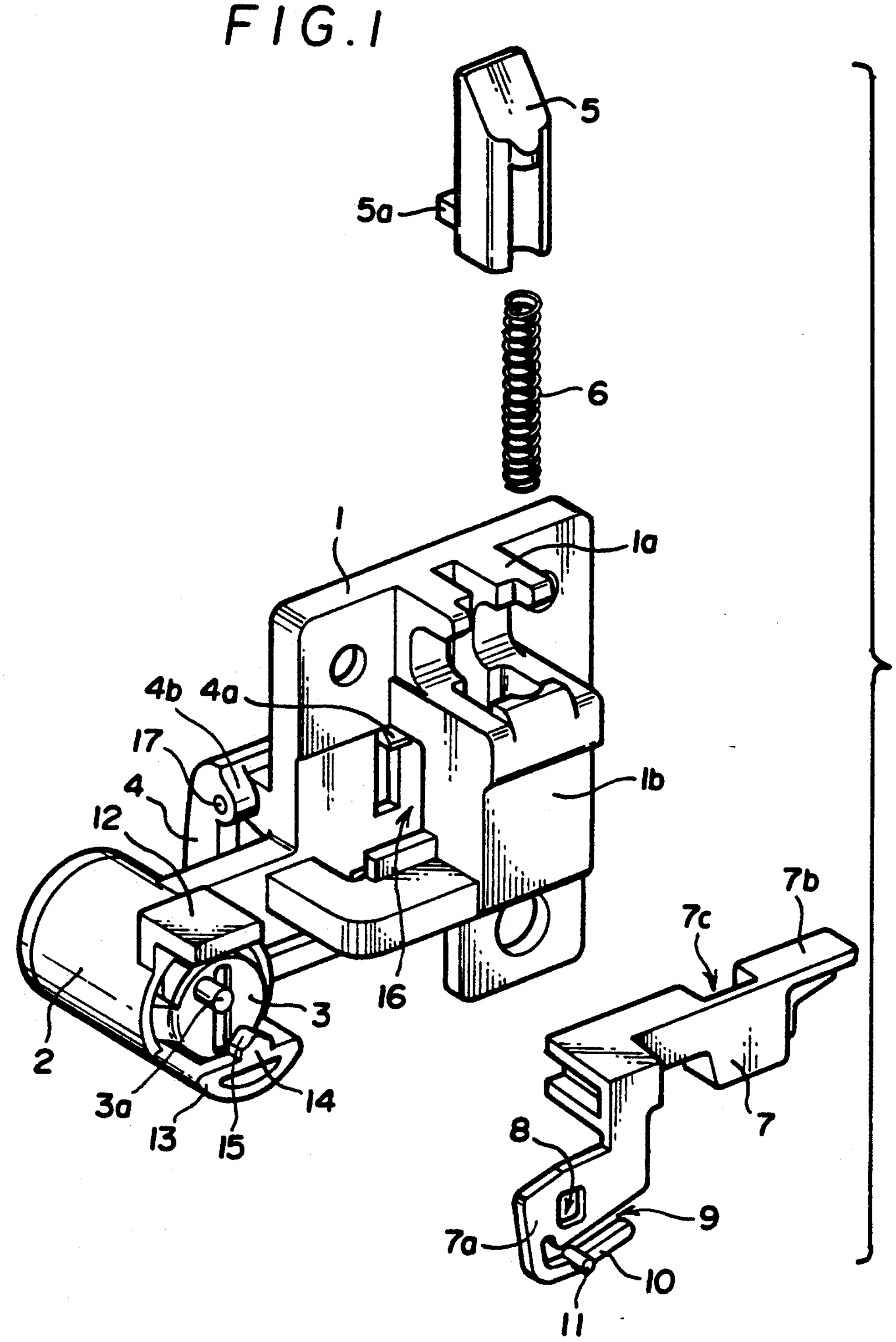
FIG. 1 is a partially exploded rear perspective view of a locking device for a lid as one embodiment of this invention.

Now, this invention will be described in detail below with reference to one embodiment illustrated in the drawings.

Figure 6:
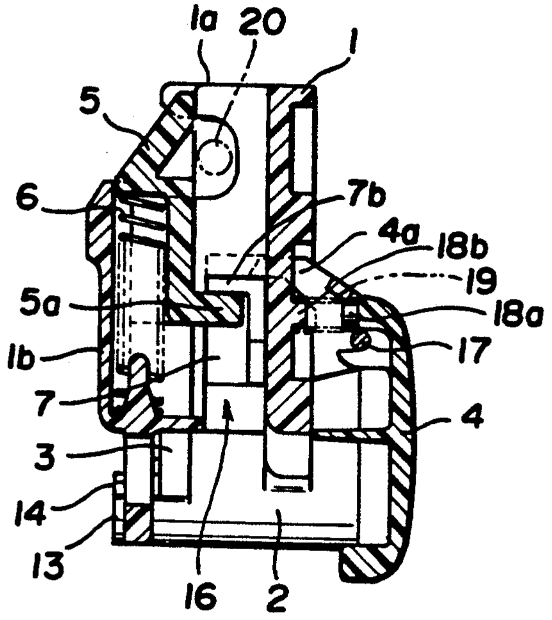
FIG. 6 is a cross section of the locking device in a state in which a lid is shut.
Figure 7:
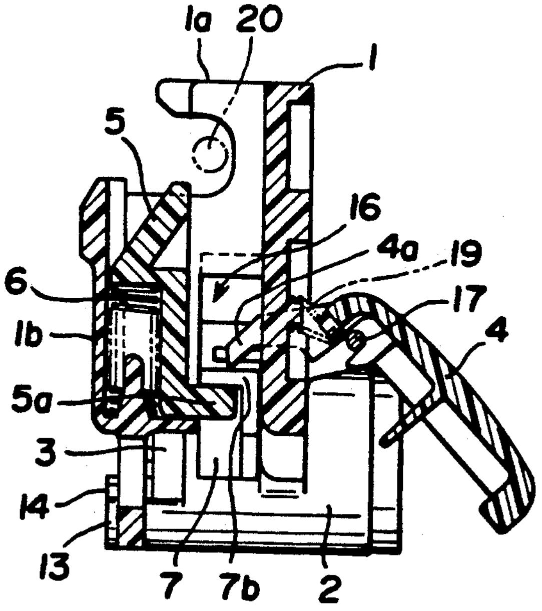
FIG. 7 is a cross section of the locking device in a state in which the lid is opened by raising an opening-shutting knob.

The locking device according to this invention has been developed for use in a lid which is provided for an automobile glove compartment. As illustrated in FIG. 1, the basic construction of the locking device comprises a frame 1 made of synthetic resin and fixed to a lid (not shown), a cylindrical retaining part 2 concurrently serving as an outer case for a cylinder lock 3 and integrally extending from one lateral apart of the frame, the cylinder lock 3 rotatably inserted inside the cylindrical retaining part 2, an opening-shutting knob 4 pivotally supported on the front surface side of the frame 1, a storing (or retaining) part 1*a* having a cross section similar to the shape of three sides of a square formed on the rear surface side of the frame 1 and adapted to store a striker 20 (FIG. 6 or FIG. 7) disposed on the glove compartment (not shown) side, a guide cylinder part 1*b* formed below the storing part 1*a*, a locking member 5 vertically slidably mounted int he guide cylinder part and adapted to open or shut the opening of the storing part 1*a*, and a coil spring 6 for constantly urging the locking member 5 toward a position in which it covers (or shuts) the opening of the storing part 1*a*.

With the basic construction described above taken as a pre-condition, the present embodiment additionally adopts a construction which comprises an operating lever 7 formed as a one-piece (or unitary) component of a synthetic resin material and adapted to promote the motion of the locking member 5. A connection hole 8 is formed substantially in the central part of one terminal part (or end portion) 7*a* of the operating lever 7 and is adapted to allow idle insertion of an eccentric shaft 3*a* formed at the rear end of the cylinder lock 3, an elastic engaging piece 10 integrally formed below the aforementioned terminal part 7*a* to define a laterally extending L-shaped slit 9, and a pin-like projecting part 11 formed on a lateral (or inner) surface of the elastic engaging piece 10. The other terminal part (or end portion) 7*b* of the operating lever 7 is shaped so as to engage with a projecting pin 5*a* of the locking member 5 and, at the same time, interfere with (or engage) a depressing claw part 4*a* formed at an upper portion of the rear surface side of the opening-shutting knob 4. A recessed shelter part 7*c* adapted to preclude the otherwise inevitable interference of the opening-shutting knob 4 with the depressing claw part 4*a* is spaced toward the center of the lever 7 form the other terminal part 7*b*. The position at which the projecting part 11 is formed need not be limited to the lateral surface of the elastic engaging piece 10. The projecting part 11 may be formed in a convex shape at a suitable position on the lower surface side of the elastic engaging piece 10 to adapt to the particular arrangement of a particular embodiment.

The present embodiment further adopts a construction which comprises upper and lower guide walls 12 and 13 integrally extending from the upper and lower parts of the rear terminal edge of the cylindrical retaining part 2 adapted to have the cylinder lock 3 inserted therein. The upper and lower guide walls 12 and 13 are adapted to allow one terminal part 7*a* of the operating lever 7 to be driven therebetween. A stopper wall 14 is provided with an angular changeover slide surface 15 and is integrally formed at the leading terminal part of the lower guide wall 13. The elastic engaging piece 10 of the operating lever 7 is resiliently engaged with the inner side of the stopper wall 14, and the projecting part 11 of the elastic engaging piece 10 is movable from one side to the other over the changeover slide surface 15 of the stopper wall 14.

Figure 2:
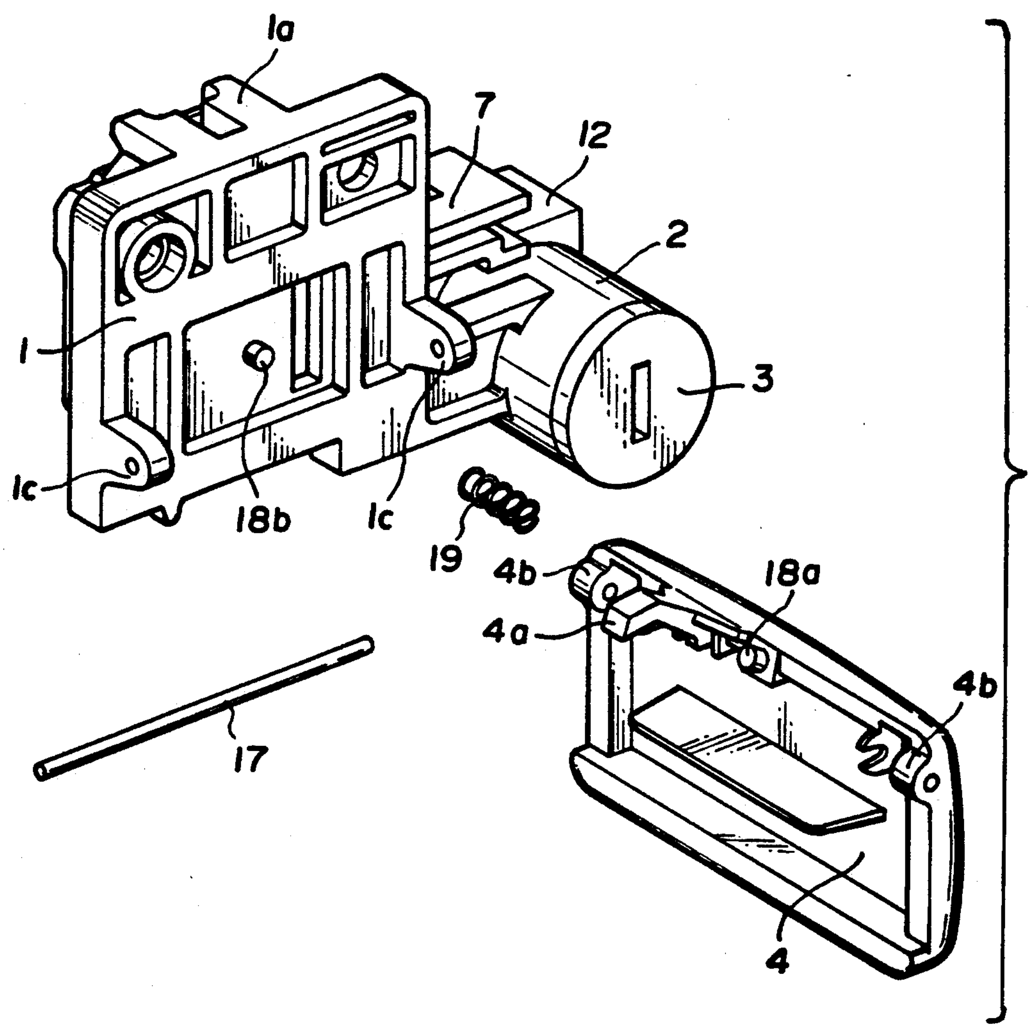
FIG. 2 is a partially exploded front perspective view of the locking device.

Further, with respect to the mechanism for pivotally supporting the opening-shutting knob 4 on the front surface side of the frame 1 through a supporting shaft 17, the present embodiment adopts a construction which, as specifically illustrated in FIG. 2, comprises projecting retaining parts 18*a* and 18*b* respectively formed integrally on the upper rear surface side of the opening-shutting knob 4 and the front surface side of the frame 1, and a single return-motion compression coil spring 19 directly set in place between the opposed surfaces of the retaining parts 18*a* and 18*b*. These retaining parts 18*a* and 18*b* need not be limited to the shapes shown in FIG. 2. They may be formed as recesses or one of them may be formed as a projection and the other as a recess to suit the convenience of the embodiment so long as they are capable of readily retaining the terminal parts of the compression coil spring 19. In FIG. 2, 4*b* designates bearing parts of the opening-shutting knob 4, and 1*c* designates bearing parts of the frame 1. These bearings 1*c*, 4*b* support the supporting shaft 17.

Figure 3:
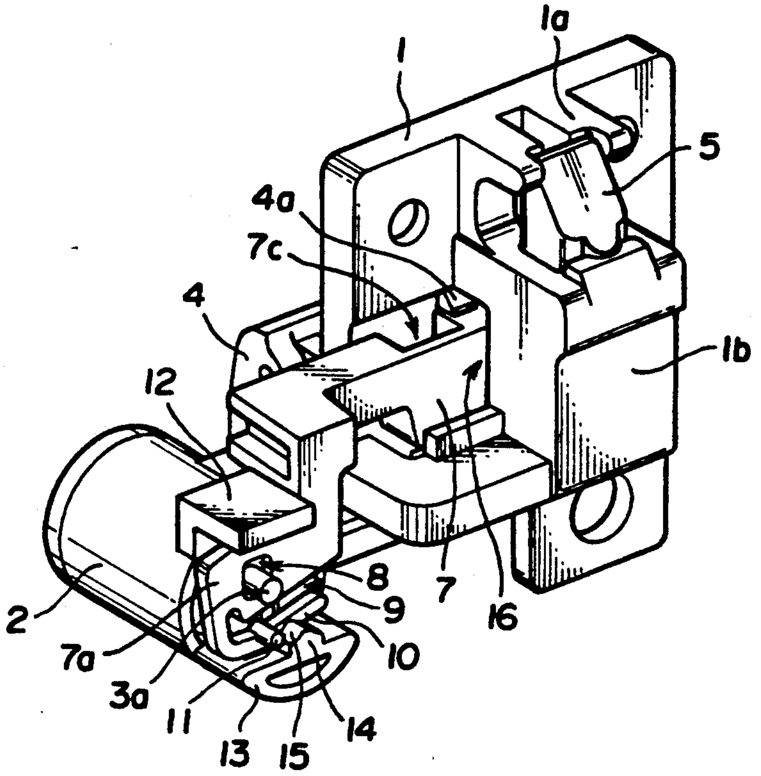
FIG. 3 is a rear perspective view of the locking device in an assembled state.

In the locking device constructed as described above, therefore, the elastic engaging piece 10 on the one terminal part 7*a* side is bent inwardly (i.e. toward the slit 9) and caused to ride over the stopper wall 14 to automatically resiliently engage with the inner side of the stopper wall 14, while the coil spring 6 and the locking member 5 are supported in place inside the guide cylinder part 1*b* of the frame 1. The other terminal part 7*b* of the operating lever 7 is inserted into a notch 16 formed in the lateral surface of the guide cylinder part 1*b*, such that the other terminal part 7*b* engages downwardly against the projecting pin 5*a* of the locking member 5. The eccentric shaft 3*a* is inserted in the connection hole 8 of the terminal part 7*a* of the operating lever 7, and the one terminal part 7*a* of the operating lever 7 is inserted in the space between the upper and lower guide walls 12 and 13 of the cylindrical retaining part 2. As a result, the one terminal part 7*a* of the operating lever 7 is infallibly supported in place on the frame 1 side as illustrated in FIG. 3.

In the present embodiment, therefore, the operating lever 7 can be infallibly fastened on the frame 1 side simply by a single depressing operation without requiring the use of a fall-preventing part such as indispensably required in the conventional locking device.

Further, in the locking device of the present embodiment, since one compression coil spring 19 is used in the place of the conventional double-torsion spring to provided for return motion, the compression coil spring 19 can be set in place between the retaining parts 18a and 18b by the use of a simple jig even after the opening-shutting knob 4 has been pivotally supported on the frame 1 side by the supporting shaft 17. As a result, the work of setting the opening-shutting knob 4 in place can be simplified to a great extent.

Figure 4:
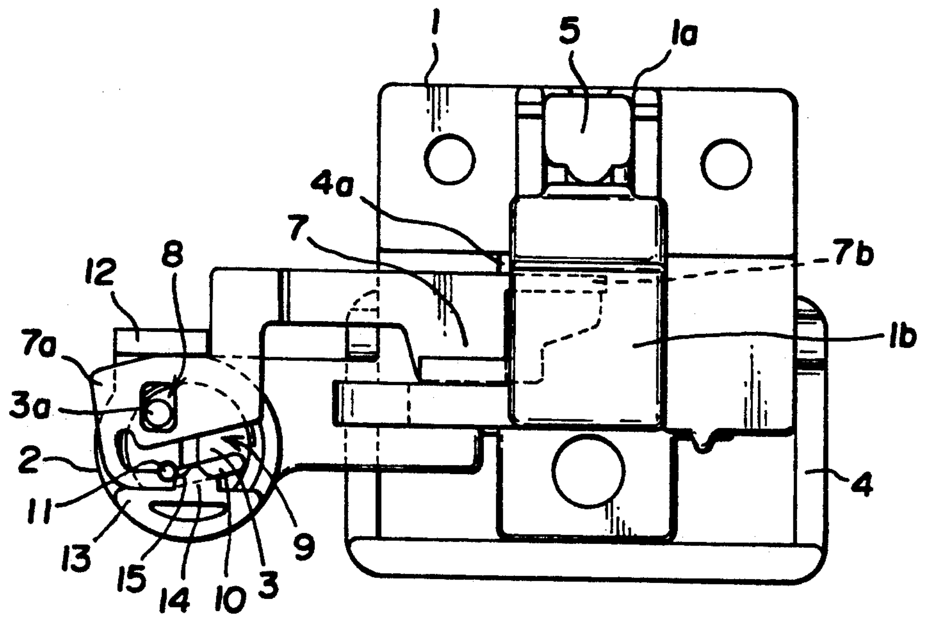
FIG. 4 is a rear view of the locking device in an unlocked state.
Figure 5:
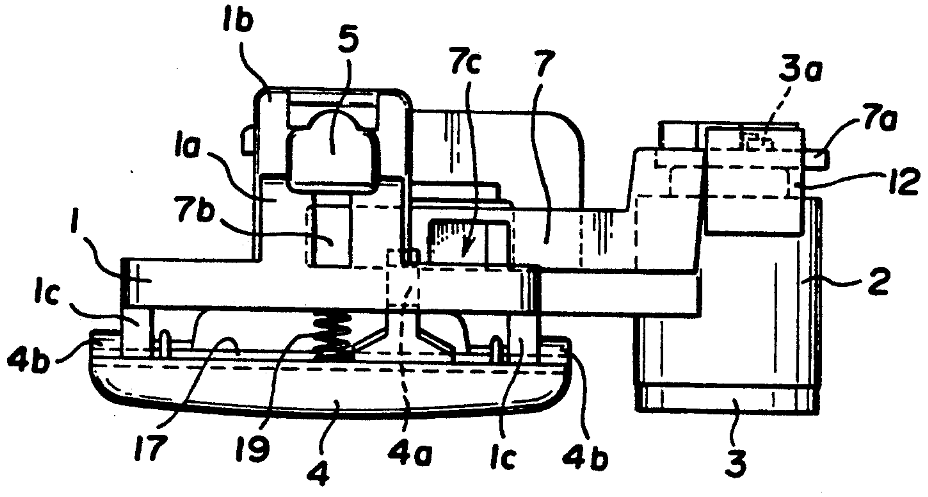
FIG. 5 is a plan view of the locking device in an unlocked state.

When the key for initiating actual use of the locking device is manipulated to rotate the cylinder lock 3 in the unlocking direction to set the locking device in the unlocked state, the operating lever 7 is moved in the direction of the cylinder lock 3 upon rotation of the cylinder lock 3 and the other terminal part 7b of the operating lever 7 is moved to below the depressing claw part 4a of the opening-shutting knob 4 as illustrated in FIG. 4. Thereafter, by lifting the opening-shutting knob 4 against the resilient pressure of the compression coil spring 19 to cause a change from the state illustrated in FIG. 6 to that in FIG. 7, the other terminal part 7b side of the operating lever 7 is pressed downwardly by the depressing claw part 4a of the knob 4, and the locking member 5 is lowered against the resilient pressure of the coil spring 6 due to engagement of the lever 7 on the engaging pin 5, to thereby release the striker 20 from inside the storing part 1a. As a result, release of the lid from the glove compartment can be ensured.

While the locking device is in the unlocked state, the lid can be shut by moving the lid in the shutting direction, thereby causing the striker 20 to force the locking member 5 downwardly and enter the storing part 1a through the opening now in an open state. Because of the upward during force of the spring 6, the striker will automatically be locked inside the storing part 1a. Thus, the lid can be easily shut.

In this case, when the locking member 5 is lowered, the opening-shutting knob 4 is liberated from the resilient pressure of the coil spring 6 and is consequently allowed to assume a free state. At this time, owing to the resilient pressure of the compression coil spring 19, the opening-shutting knob 4 is prevented from accidentally generating a back lash and is urged resiliently toward the home position.

Figure 8:
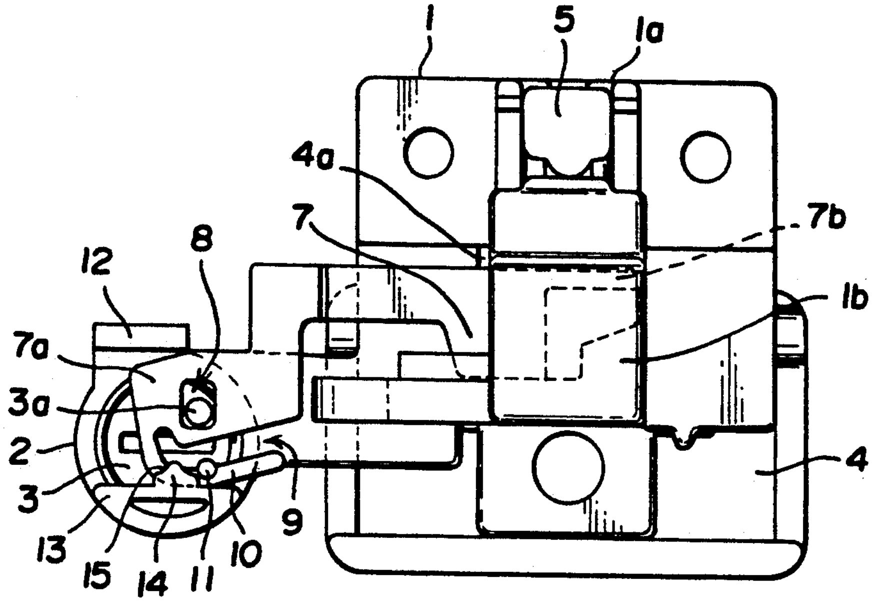
FIG. 8 is a rear view of the locking device in a locked state.
Figure 9:
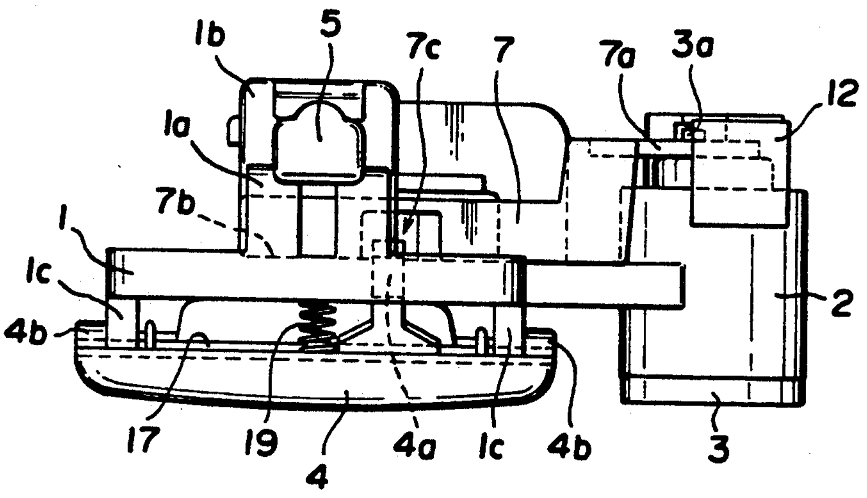
FIG. 9 is a plan view of the locking device in a locked state.

To use the locking device for protection against theft, the key is manipulated to move the cylinder lock 3 in the reverse direction, i.e. in the locking direction, so that the operating lever 7 is moved in the direction away from the cylinder lock 3 upon rotation of the cylinder lock 3, as shown in FIG. 8 and FIG. 9, and the recessed shelter part 7c of the operating lever 7 is caused to assume a position below the depressing claw part 4a of the opening-shutting knob 4. When the knob 4 is pulled up time and again with the lever 7 in this state, the depressing claw part 4a of the knob 4 is swung in the open space (i.e. through the recessed shelter part 7c), such that the operating lever 7 cannot be depressed downwardly. Thus, the locking device is able to assume the locked state infallibly. Again in this case, since the opening-shutting knob 4 is kept without fail under the influence of the resilient pressure of the compression coil spring 19, it is prevented from accidentally generating a backlash and is kept urged in the direction of the home position.

Further, in the present embodiment, when the operating lever 7 is moved in the lateral direction by the eccentric shaft 3a upon rotation of the cylinder lock 3 during both locking and unlocking, the projecting part 11 of the elastic engaging piece 10 climbs over the angular changeover slide surface 15 of the stopper wall 14 to continue its motion, as illustrated in FIG. 4 and FIG. 8. This climb of the projecting part 11 over the angular changeover slide surface 15 always produces a distinct click and consequently enhances the feeling of the key operation and, at the same time, facilitates confirmation of the locked state and the unlocked state.

Also, the construction which allows the projecting part 11 of the elastic engaging part 10 to be positioned alternatively on opposite sides of the changeover slide surface 15 of the stopper wall 14 in the manner described above enables the one terminal part 7a of the operating lever 7 to be pre-positioned by making use of the sliding surface 15 of the stopper 14. Unlike the conventional construction, therefore, even when the cylinder lock 3 is later set in place inside the cylindrical retaining part 2 of the frame 1, the task of causing the connection hole 8 of the one terminal part 7a to coincide with the eccentric shaft 3a of the cylinder 3 is facilitated. This ease of task performance has proven to be highly advantageous.

In accordance with this invention, as described above, when the elastic engaging piece formed at the one terminal part of the operating lever is bent inwardly and, at the same time, pressed forcibly into engagement with the cylinder lock, the elastic engaging piece is automatically fixed in place on the inner side of the stopper wall formed on the cylindrical retaining part side, and the one terminal part of the operating lever is infallibly retained in engagement with the cylinder lock. As a result, the locking device of this invention enable the one terminal part of the operating lever to be quickly set in place by a single operating acting on the cylinder lock side without requiring use of the conventionally indispensable fall-preventing part. Further, since this operating lever is formed of a synthetic resin material, the locking device enjoys a generous reduction in weight and an ample decrease in the cost of production.

When the operating lever is moved in the locking or unlocking direction by the eccentric shaft upon rotation of the cylinder lock generated by means of the key, the projecting part formed on the elastic engaging piece climbs over the changeover slide surface of the stopper wall and continues its motion. This motion produces a distinct click when the projecting part has climbed over the changeover slide surface and consequently enhances the feeling of the key operation and facilitates confirmation of movement between the locked state and the unlocked state. This fact constitutes an additional advantage of this invention.

Moreover, this invention keeps the opening-shutting knob from producing a backlash and enables it to be resiliently urged infallibly toward the home position simply by having the retaining parts respectively formed on opposing surfaces of the opening-shutting knob and the frame and setting in place the compression coil spring between the opposed retaining parts. Even from this point of view, this invention can be expected to allow ample improvement in the operational efficiency of the work of assembling component parts as compared with the conventional locking device. In any event, this feature contributes to lowering the cost of the locking device.

What is claimed is:

1. A locking device for a lid on a box having a striker mounted thereon, said locking device comprising:

a frame adapted to be fixed to the lid, said frame being provided with a cylindrical retaining part;

a cylinder lock mounted in said cylindrical retaining part and having an eccentric shaft;

an opening-shutting knob having a depressing claw part and being pivotally supported on said frame;

a locking member for locking the striker to said frame;

an operating lever having first and second end portions and being movable between locking and unlocking positions, said first end portion being connected to said eccentric shaft of said cylinder lock and said second end portion being engageable with said depressed claw part of said opening-shutting knob when said operating lever is in said unlocking position;

wherein said operating lever is formed of a synthetic resin material and has an elastic engaging piece integrally formed on said first end portion, said elastic engaging piece having a projecting part formed thereon;

wherein said frame has a stopper formed adjacent said cylindrical retaining part, said stopper wall being provided with a changeover slide surface and having said elastic engaging piece secured on an inner side of said stopper wall between said cylinder lock and said stopper wall; and wherein said projecting part of said elastic engaging piece is movable along said changeover slide surface of said stopper wall.

2. A locking device according to claim 1, wherein said operating lever has a laterally L-shaped slit defined above said elastic engaging piece, said projecting part is a pin integrally formed on a lateral surface of said elastic engaging piece, said cylindrical retaining part of said frame has an upper guide wall and a lower guide wall integrally extending from upper and lower parts of a rear terminal edge thereof, respectively, for permitting insertion of said first end portion of said operating lever therebetween and guiding movement of said first end portion, said changeover slide surface of said stopper wall is angular, and said stopper wall is formed integrally on said lower guide wall.

3. A locking device according to claim 1, further comprising a first retaining part formed on a surface of said opening-shutting knob facing said frame, a second retaining part formed on a surface of said frame so as to face said first retaining part of said opening-shutting knob, and a compression coil spring for return motion interposed between said first retaining part and said second retaining part.

4. A locking device according to claim 2, further comprising a first retaining part formed on a surface of said opening-shutting knob facing said frame, a second retaining part formed on a surface of said frame so as to face said first retaining part of said opening-shutting knob, and a compression coil spring for return motion interposed between said first retaining part and said second retaining part.

5. A locking device for a lid on a box having a striker mounted thereon, said locking device comprising:

a frame adapted to be fixed to the lid, said frame having a front face;

a cylinder lock mounted on said frame and being provided with an eccentric shaft;

an opening-shutting knob pivotally supported on said frame for movement between an opening position and a shutting position, said opening-shutting knob having a depressing claw part and having a rear face confronting said front face of said frame;

a locking member for locking the striker to said frame;

an operating lever having first and second end portions and being movable between a locking position and an unlocking position, said first end portion being connected to said eccentric shaft of said cylinder lock and said second end portion being engageable with said depressing claw part of said opening-shutting knob when said operating lever is in said unlocking position;

a first retaining part formed on said front face of said frame;

a second retaining part formed on said rear face of said opening-shutting knob, said second retaining part confronting said first retaining part and being in substantially front-to-rear alignment with said first retaining part when said opening-shutting knob is in said shutting position; and a compression coil spring, interposed between said first and second retaining parts and extending in a substantially front-to-rear direction when said opening-shutting knob is in said shutting position, for urging said opening-shutting knob toward said shutting position.

6. A locking device as recited in claim 5, wherein said first retaining part comprises a projection fixed to said front face of said frame and projecting forwardly therefrom.

7. A locking device as recited in claim 6, wherein said second retaining part comprises a projection fixed to said rear face of said opening-shutting knob and extending rearwardly therefrom.

8. A locking device as recited in claim 1, wherein said second retaining part comprises a projection fixed to said rear face of said opening-shutting knob and extending rearwardly therefrom.

* * * * *